(12) United States Patent
Quast et al.

(10) Patent No.: US 12,741,568 B2
(45) Date of Patent: Sep. 22, 2026

(54) LONGITUDINAL ADJUSTER FOR A VEHICLE SEAT, AND VEHICLE SEAT

(71) Applicant: Adient US LLC, Plymouth, MI (US)

(72) Inventors: Ingo Quast, Düsseldorf (DE); Erik Sprenger, Wermelskirchen (DE)

(73) Assignee: Adient US LLC, Plymouth, MI (US)

( * ) Notice: Subject to any disclaimer, the term of this patent is extended or adjusted under 35 U.S.C. 154(b) by 156 days.

(21) Appl. No.: 18/869,359

(22) PCT Filed: May 31, 2023

(86) PCT No.: PCT/IB2023/055566
§ 371 (c)(1),
(2) Date: Nov. 26, 2024

(87) PCT Pub. No.: WO2023/233313
PCT Pub. Date: Dec. 7, 2023

(65) Prior Publication Data

US 2025/0303930 A1 Oct. 2, 2025

(30) Foreign Application Priority Data

May 31, 2022 (DE) ........................ 10 2022 205 471
Aug. 26, 2022 (DE) ........................ 10 2022 208 885

(51) Int. Cl.
*B60N 2/02* (2006.01)
*B60N 2/06* (2006.01)

(52) U.S. Cl.
CPC ......... *B60N 2/02253* (2023.08); *B60N 2/067* (2013.01)

(58) Field of Classification Search
None
See application file for complete search history.

(56) References Cited

U.S. PATENT DOCUMENTS 11,433,785 B2 * 9/2022 Aktas ........................ B60N 2/43
2018/0215287 A1 * 8/2018 Koop ..................... B60N 2/067

FOREIGN PATENT DOCUMENTS

DE 19860910 A1 7/2000
DE 10056443 A1 5/2002
DE 10062217 A1 7/2002
(Continued)

OTHER PUBLICATIONS

European Patent Office, International Search Report and Written Opinion in Application No. PCT/IB2023/055566, dated Oct. 16, 2023, 11 pages, Rijswijk Netherlands.

*Primary Examiner* — Joshua J Michener
*Assistant Examiner* — Nevena Aleksic
(74) *Attorney, Agent, or Firm* — Marshall & Melhorn, LLC

(57) ABSTRACT

A longitudinal adjuster may have a pair of rails and a drive device for the pair of rails. The pair of rails may have a first rail and has a second rail on which the first rail is displaceably guided. The drive device may have at least one motor, a transmission unit, a spindle block which has an inner thread, and a spindle which has an outer thread operatively connected to the inner thread of the spindle block, a spindle bearing and a coupling for coupling the spindle and the motor. The spindle may be mounted along a spindle axis to rotate in the spindle block, the transmission unit, the coupling, the spindle, the spindle bearing and optionally the motor being arranged on a shared axis within the pair of rails. A vehicle seat may be provided with the longitudinal adjuster.

9 Claims, 4 Drawing Sheets

(56) References Cited

FOREIGN PATENT DOCUMENTS

| | | | |
|---|---|---|---|
| DE | 10238750 | A1 | 3/2003 |
| DE | 102017101996 | A1 | 8/2018 |
| DE | 102017218492 | A1 | 2/2019 |

* cited by examiner

LONGITUDINAL ADJUSTER FOR A VEHICLE SEAT, AND VEHICLE SEAT

FIELD

The invention relates to a longitudinal adjuster for a vehicle seat, in particular a motor vehicle seat. The invention also relates to a vehicle seat.

BACKGROUND

DE 10 2017 218 492 A1 discloses a longitudinal adjuster, in particular for a vehicle seat. The longitudinal adjuster has at least one rail pair, which is formed from a first rail and a second rail which is displaceable in the longitudinal direction relative to the first rail, wherein the rails mutually engage around each other so as to form an inner channel. A spindle nut, which is mounted with the second rail, and a spindle, which is operatively connected to the spindle nut, are arranged in the inner channel, wherein a gearing mechanism, which is drivable by means of a motor and interacts with the spindle, is arranged at an end of the first rail. The spindle is mounted at a front end portion of the spindle in the gearing mechanism and at a rear end portion of the spindle in a rotary bearing of the first rail. A first transverse bar is accommodated in a slot of the first rail upstream of the spindle nut in the longitudinal direction, wherein the spindle is guided through an opening of the first transverse bar in a contact-free manner, in particular so as to form a circumferential gap, wherein a shoulder of the spindle is arranged at a distance from the first transverse bar toward the front in the longitudinal direction, wherein, in response to a predetermined application of force, for example in the event of a crash, in particular by displacement of the first rail, the first transverse bar is clamped between the first rail and the shoulder and a force from the first rail can thereby be transmitted to the second rail via the first transverse bar, the shoulder, the spindle and the spindle nut.

DE 100 62 217 A1 and DE 10 2017 101 996 A1 disclose adjustment devices for a vehicle seat with direct drives arranged along the longitudinal extent of the rails. DE 100 56 443 A1 and DE 102 38 750 A1 disclose adjustment devices for a vehicle seat in which a common drive is arranged between two pairs of rails.

SUMMARY

The problem addressed by the invention is that of improving a longitudinal adjuster of the type mentioned at the outset, in particular proposing an electrically drivable longitudinal adjuster having an integrated motor gearing unit, and providing a corresponding vehicle seat.

This problem is solved according to the invention by a longitudinal adjuster for a vehicle seat, in particular a motor vehicle seat, wherein the longitudinal adjuster has at least one rail pair having a first rail, in particular a seat rail, which is connectable to the vehicle seat, and a second rail, in particular a floor rail, which is connectable to a vehicle floor and which is displaceably guided on the first rail, in particular on the seat rail, wherein the longitudinal adjuster has a drive device for adjusting the seat rail relative to the floor rail, and the drive device has at least one motor, a gearing unit, a spindle block, which is fixed to the floor rail or to the seat rail and has an internal thread, and a spindle having an external thread which is operatively connected to the internal thread of the spindle block, and the spindle extends along the longitudinal axis thereof and is mounted in the spindle block so as to be rotatable about a spindle axis, wherein a coupling, the spindle, a spindle bearing and optionally the gearing unit are arranged on a common axis within the rail pair, in particular within the seat rail, and wherein a drive axis of the motor, or optionally a geared motor axis, runs so as to be offset from the common axis within the rail pair and the motor is arranged at least in part within the rail pair.

In particular, the common axis is arranged in a cavity in the rail pair. The common axis is enclosed by the seat rail and the floor rail.

The drive device may comprise separate components, for example in the form of a motor and a gearing unit, coupled to one another. Alternatively, the drive device may for example comprise a geared motor unit which is designed as a combination of a motor and gearing unit and has the geared motor axis. The motor may for example be an electric motor, in particular an asynchronous motor or a synchronous motor.

In the exemplary embodiment with separate components, the motor axis deviates from the common axis formed by the gearing unit, the coupling, the spindle and the spindle bearing. For example, the motor axis may have an offset in all spatial directions, for example a parallel offset or an angular offset, relative to the common axis of the gearing unit, coupling, spindle and spindle bearing. If the motor axis is offset from the common axis, all axes are arranged within the cavity of the rail pair.

In addition, according to the other exemplary embodiment, a driven shaft acting as the output shaft of the geared motor unit may have an output axis (also referred to as a gearing axis) which is arranged, in a manner corresponding to the drive axis, so as to be to offset from the common axis or axially in line therewith. In other words, the output axis or gearing axis of the gearing unit and the drive axis of the motor run in an identical manner, form the geared motor axis and are offset in an identical manner from the common axis of the coupling, the spindle and the spindle bearing. For example, the output axis or gearing axis of the gearing unit and the drive axis of the motor, in the form of the geared motor axis, are offset parallel or at an angle to the common axis.

The coupling between the geared motor unit and the spindle bearing is configured in such a way that this coupling can compensate for such an angular offset or parallel offset of the drive axis, or of the output axis and the drive axis. The coupling connects for example an output pin of the motor to a spindle pin or spindle end. The coupling may comprise a resilient plastic material element for transferring the motor torque to the spindle in a manner which compensates for the offset. The motor thus drives the spindle via the coupling. The coupling may for example be configured to compensate for both radial and axial play. For example, the coupling may have a damping element to compensate for radial and/or axial play.

Furthermore, a driven shaft acting as the output shaft of the geared motor unit, an axis of rotation of the coupling connecting the geared motor unit to the spindle, and the spindle axis of the spindle may be arranged so as to be axially in line with one another. For example, a first drive axis of a drive shaft or motor shaft of the motor may be arranged so as to be axially in line with an output axis of the driven shaft, the axis of rotation and the spindle axis.

The advantages afforded by the invention are, in particular, that such a common axis allows the drive device to be arranged in a compact and protected manner within the rail pair. In particular, the motor is for example designed as a micromotor and direct drive of the longitudinal adjuster, and may be arranged completely or in part in the rail pair, in particular within a cavity of the rail pair.

Furthermore, the problem is solved according to the invention by a vehicle seat comprising the longitudinal adjuster described above.

DESCRIPTION OF THE FIGURES

The invention is explained in more detail below on the basis of advantageous exemplary embodiments illustrated in the figures. However, the invention is not restricted to these exemplary embodiments. In the figures.

DETAILED DESCRIPTION

Parts which correspond to one another are denoted by the same reference signs in all the figures.

Figure 1:
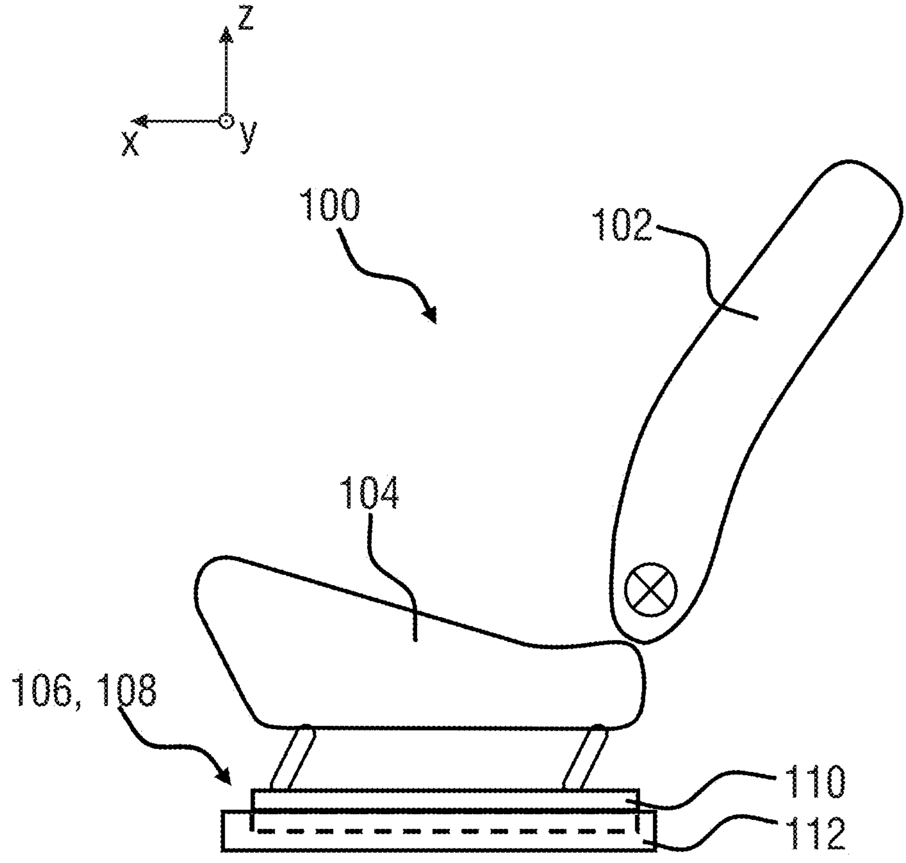
FIG. 1: shows a schematic view of a vehicle seat according to the invention having a longitudinal adjuster according to the invention.

A vehicle seat 100, schematically illustrated in FIG. 1, according to a first exemplary embodiment is described below using three spatial directions which run perpendicularly to one another. In the case of a vehicle seat 100 installed in the vehicle, a longitudinal direction x runs largely horizontally and preferably parallel to a vehicle longitudinal direction, which corresponds to the normal direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. In the case of a vehicle seat 100 installed in the vehicle, the vertical direction z runs parallel to the vehicle vertical axis.

The positional and directional indications used, such as front, rear, top and bottom, relate to a viewing direction of an occupant sitting in a vehicle seat 100 in a normal sitting position, wherein the vehicle seat 100 is installed in the vehicle, in a use position which is suitable for conveying passengers, with an upright backrest 102, and is oriented, as is customary, in the direction of travel. The vehicle seat 100 according to the invention may also be installed, however, in a different orientation, for example transversely to the direction of travel.

The vehicle seat 100 has a seat part 104 and the backrest 102 which is adjustable in terms of the inclination thereof relative to the seat part 104 and which can be pivoted forward in the direction of the seat part 104. For the longitudinally displaceable and longitudinally adjustable attachment of the vehicle seat 100 in the vehicle, the vehicle seat 100 has a longitudinal adjuster 106.

The longitudinal adjuster 106 is used for longitudinal adjustment, that is to say for the adjustment of a longitudinal seat position, of the vehicle seat 100. Preferably, the vehicle seat 100 has a longitudinal adjuster 106 on each side of the vehicle seat. A first longitudinal adjuster 106 is arranged on a tunnel side and a second longitudinal adjuster 106 is arranged on a sill side. The two longitudinal adjusters 106 of the vehicle seat 100 run parallel to one another. Preferably, the vehicle seat 100 has two structurally identical longitudinal adjusters 106.

The respective longitudinal adjuster 106 comprises a rail pair 108 having a seat rail 110, which is connectable to the vehicle seat 100, and a floor rail 112, which is connectable to a vehicle floor and on which the seat rail 110 is displaceably guided.

The two longitudinal adjusters 106 may be adjustable, in particular electronically adjustable, in a mutually synchronized manner. Only one of the two structurally identical longitudinal adjusters 106 is described below.

Figure 2:
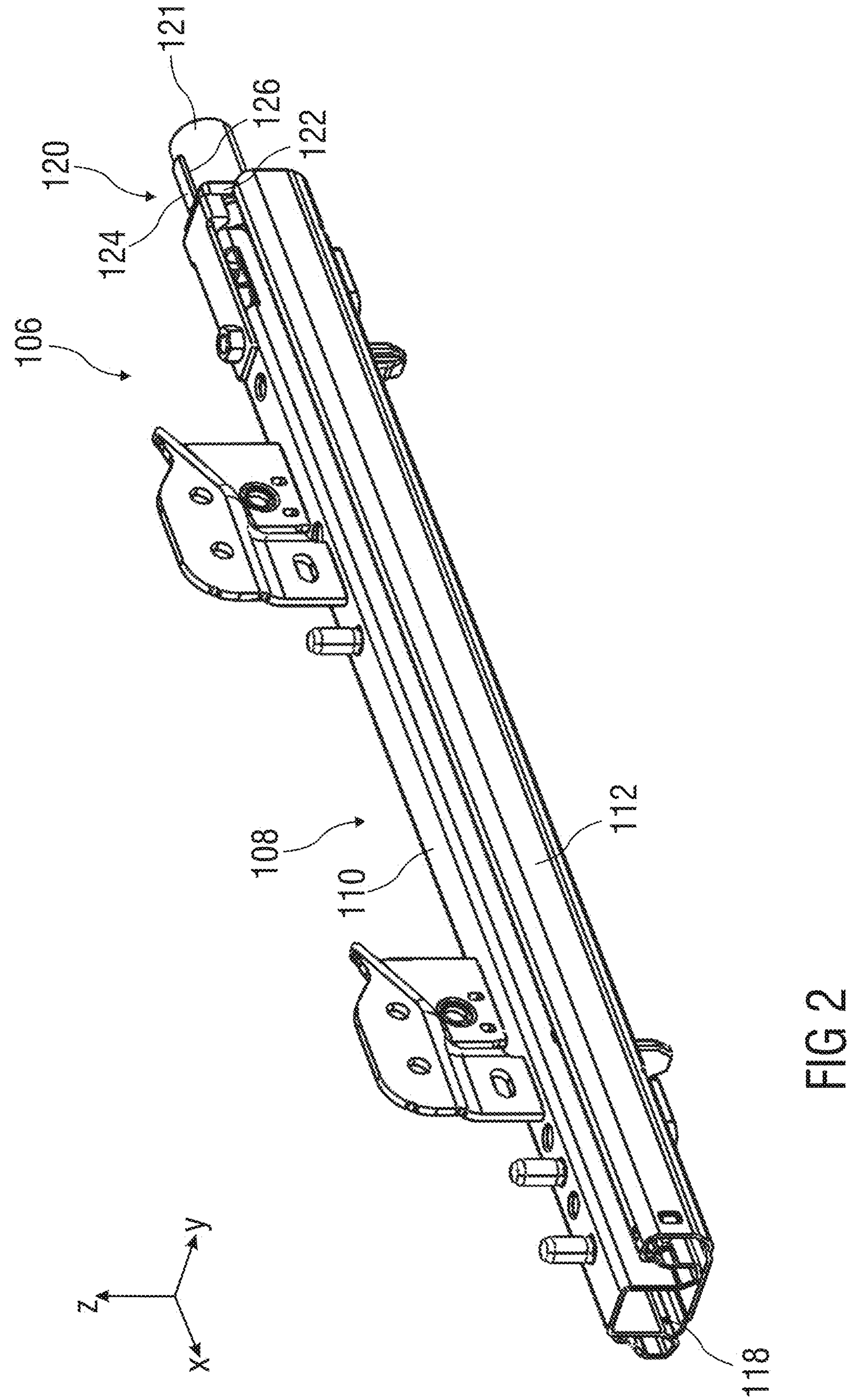
FIG. 2: shows a perspective view of the longitudinal adjuster according to the invention.
Figure 3:
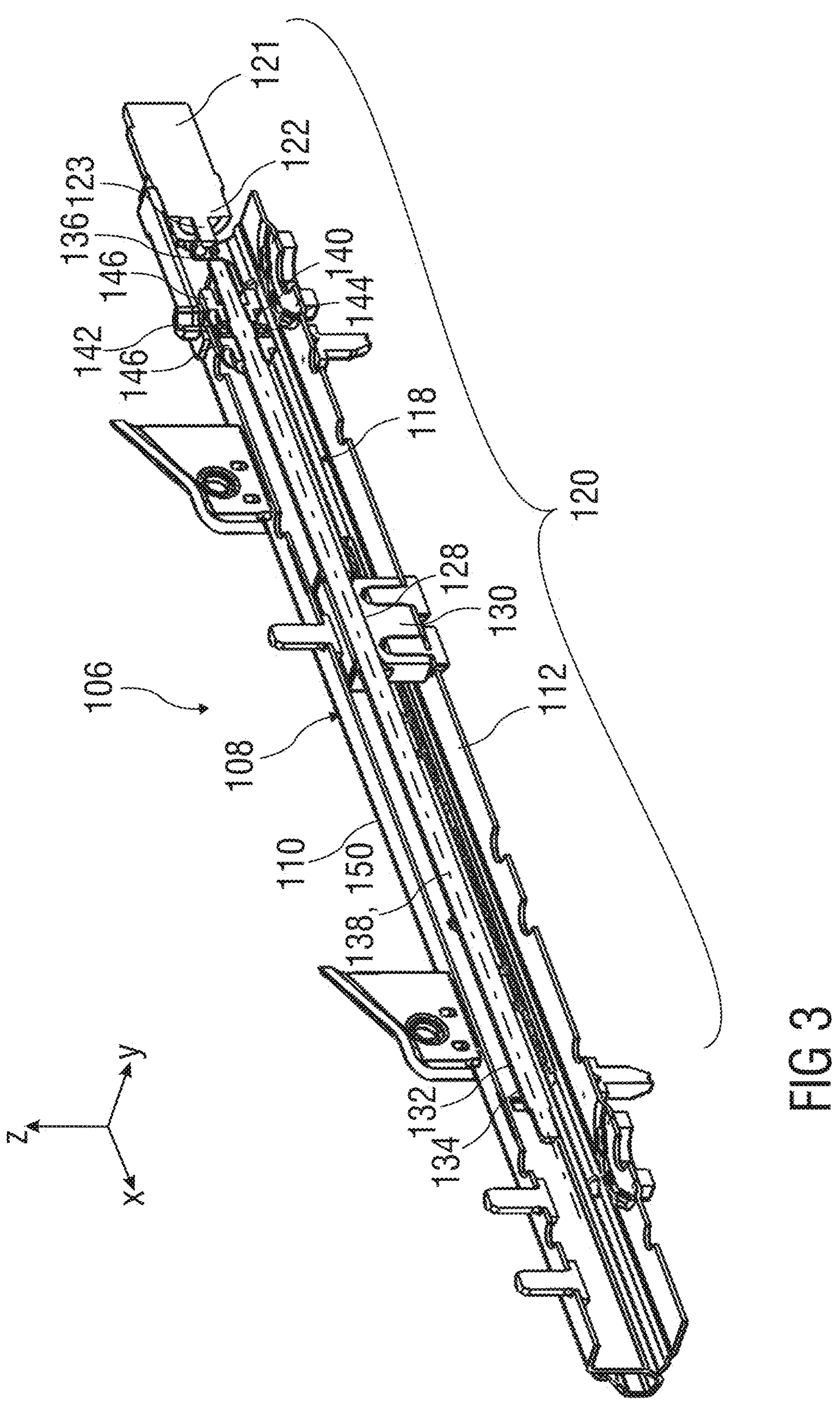
FIG. 3: shows a cutaway view of the longitudinal adjuster from FIG. 2 cut along a longitudinal direction.

FIGS. 2 and 3 show the longitudinal adjuster 106 having the rail pair 108. FIG. 2 shows a perspective view of the longitudinal adjuster 106.

The longitudinal adjuster 106 has a drive device 120 for adjusting the seat rail 110 relative to the floor rail 112. The drive device 120 has at least a motor 121 and a gearing unit 122.

The gearing unit 122 and the motor 121 are at least partially arranged in a cavity 118 formed between the seat rail 110 and the floor rail 112.

In the present case, the end face of the motor 121 protrudes at least partially into the seat rail 110 at one end of the latter. Alternatively, in a manner not illustrated, the motor 121 may project upward in the vertical direction z, through a recess in the seat rail 110, out of or through the latter.

In a further alternative, the gearing unit 122 and the motor 121 may be arranged completely within the cavity 118 of the rail pair 108.

In the present case, the gearing unit 122 is arranged completely in the cavity 118 formed between the seat rail 110 and the floor rail 112. In the present case, the motor 121 and the gearing unit 122 are jointly attached in a rear end region of the seat rail 110. This allows easy access to the motor 121 or the gearing unit 122, so that these components are easily replaceable or repairable even when a longitudinal adjuster 106 is installed in a vehicle. No additional covers or housings are required for either the gearing unit 122 or the motor 121. The motor 121 and the gearing unit 122 are thus arranged in a protected manner within the cavity 118 of the rail pair 108. The space between the two longitudinal adjusters 106 below the vehicle seat 100 is commonly used for the motor 121. Due to the direct arrangement of the motors 121 in the respective cavity 118 of the rail pairs 108, this space is now free, for example for the arrangement of a battery (not illustrated) for the motor 121, an electronic unit or the like.

The gearing unit 122 can be connected to the seat rail 110, in particular in a force-fitting manner, for example screwed, by a material bond, for example welded by means of a fastening 124 with a seam 126, and/or in a form-fitting manner, for example pressed, in order to be able to transfer high forces.

The motor 121 and the gearing unit 122 may for example be designed as separate units. Alternatively, the motor 121 and the gearing unit 122 may be designed as a geared motor unit 125 and thus take the form of an integrated unit.

FIG. 3 shows a cutaway longitudinal view of the longitudinal adjuster 106.

The drive device 120 is for example designed as a spindle drive. The drive device 120 comprises at least the motor 121, the gearing unit 122, a spindle block 130, which is fixed to the floor rail 112 or to the seat rail 110 and has an internal thread 128, and a spindle 132 having an external thread 134 which is operatively connected to the internal thread 128 of the spindle block 130.

The drive device 120 may for example be based on a rotating spindle 132, in particular a spindle 132 mounted so as to be rotatable relative to the seat rail 110, this spindle implementing a longitudinal adjustment via a nut, the spindle block 130, fastened to the floor rail 112. A self-locking mechanism required between the spindle block 130 and the spindle 132 for load dissipation in the event of a crash may be achieved by a corresponding (fine) pitch of the threads (internal thread 128 and external thread 134, in particular trapezoidal threads (for example Tr8x2)).

The drive device 120 further comprises a coupling 136 for coupling the motor 121, in particular the gearing unit 122, to the spindle 132, in particular to the spindle bearing 140. The motor 121 is coupled indirectly to the spindle bearing 140 via the gearing unit 122 and the coupling 136. The coupling 136 is arranged in particular between the spindle 132 and the driven shaft 123. The coupling 136 may be a conventional coupling 136 for compensating tolerances and may for example be designed as a compensating coupling or friction coupling.

The coupling 136 connects for example an output pin of the motor 121 to a spindle pin or spindle end of the spindle 132. The coupling 136 may comprise a resilient plastic material element 136.1 for transferring the motor torque to the spindle 132 in a manner which compensates for the offset. The motor 121 thus drives the spindle 132 via the coupling 136. The coupling 136 may for example be configured to compensate for both radial and axial play. For example, the coupling 136 may have a damping element 136.2 to compensate for radial and/or axial play.

The spindle 132 extends along a longitudinal axis and is mounted in the spindle block 130 and a spindle bearing 140 so as to be rotatable about a spindle axis 138. The coupling 136, the spindle 132, the spindle bearing 140, optionally the gearing unit 122 and optionally the motor 121 are arranged on a common axis 150 within the rail pair 108.

For example, the common axis 150 is arranged in the cavity 118 of the rail pair 108. The common axis 150 is enclosed by the seat rail 110 and the floor rail 112.

The spindle 132 is for example screwed into and mounted in the spindle block 130 so as to be rotatable about the spindle axis 138. If the spindle block 130 is stationary, in particular rigidly screwed to the floor rail 112, the spindle 132 is mounted in the spindle block 130 so as to be axially movable in the longitudinal direction x and rotatably movable about the spindle axis 138 (rotary axis).

Figure 4:
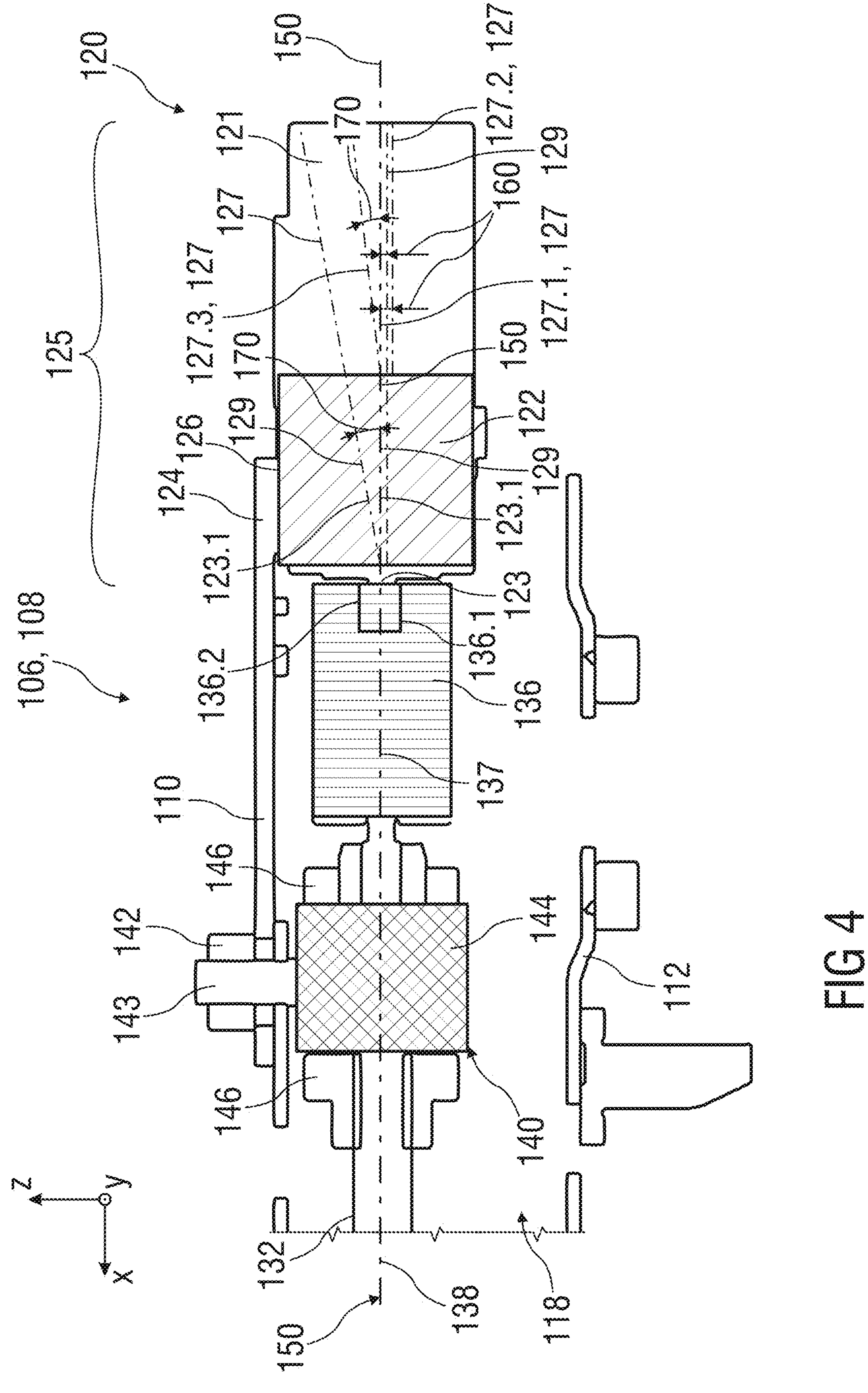
FIG. 4: shows a schematic sectional view of an end of the longitudinal adjuster from FIG. 2.

The spindle 132 is rigidly connected to the seat rail 110 for example via the spindle bearing 140, for example screwed thereto by means of a connecting nut 142 and a connecting bolt 143 (illustrated in FIG. 4). Alternatively, the spindle bearing 140 may be connected to the seat rail 110 by a material bond, in particular welded, or in a force-fitting manner, in particular pressed. The spindle bearing 140 comprises for example a ball bearing 144, which may be delimited on both sides by a spindle nut 146. It is also possible for only one spindle nut 146 to be provided.

The motor 121 and the gearing unit 122 form for example a unit. The motor 121 and the gearing unit 122 may for example be designed as an integrated geared motor unit 125 (illustrated in FIG. 4).

FIG. 4 shows a schematic sectional view of an end of the longitudinal adjuster 106 from FIG. 2.

FIG. 4 shows the end of the longitudinal adjuster 106, in which the spindle bearing 140 and the spindle nuts 146, the coupling 136, the gearing unit 122 and the motor 121 are arranged.

The spindle bearing 140, the two spindle nuts 146, the coupling 136 and at least part of the gearing unit 122 are arranged completely in the cavity 118 between the seat rail 110 and the floor rail 112. The motor 121 projects, at least in part, out of the cavity 118 of the rail pair 108 in an axial manner.

The spindle bearing 140 is connected to the seat rail 110 by means of the connecting bolt 143 and the connecting nut 142.

At least one driven shaft 123 acting as the output shaft of the geared motor unit 125, an axis 137 of rotation of the coupling 136 connecting the geared motor unit 125 to the spindle 132 and the spindle axis 138 of the spindle 132 are arranged so as to be axially in line in a first exemplary embodiment. "Axially in line" means that the driven shaft 123, the axis 137 of rotation and the spindle axis 138 are located as precisely as possible in one line.

In the first exemplary embodiment, a first drive axis 127.1 of a drive shaft 127 or motor shaft of the motor 121 may be arranged so as also to be axially in line with an output axis 123.1 of the driven shaft 123, the axis 137 of rotation and the spindle axis 138. In this first exemplary embodiment, the first drive axis 127.1, the output axis 123.1, the axis 137 of rotation and the spindle axis 138 are arranged on the common axis 150. In particular, the axis 137 of rotation and the spindle axis 138 are arranged completely within the rail pair 108. The output axis 123.1 and the first drive axis 127.1 may be arranged partially within the rail pair 108 or completely within the rail pair 108 (not illustrated).

In a second exemplary embodiment, a second drive axis 127.2 of the drive shaft 127 of the motor 121 may be arranged with a parallel offset 160 relative to the output axis 123.1 of the driven shaft 123, the axis 137 of rotation and the spindle axis 138, and thus to the common axis 150 thereof. In this second exemplary embodiment, only the output axis 123.1, the axis 137 of rotation and the spindle axis 138 are arranged on the common axis 150. The second drive axis 127.2 is arranged so as to be offset in a parallel manner from the common axis 150. In other words, the second drive axis 127.2 and the common axis 150 are offset from each other and are oriented parallel to each other in the respective longitudinal directions x thereof.

In a third exemplary embodiment, a third drive axis 127.3 of the drive shaft 127 of the motor 121 may be arranged so as to have an angular offset 170 relative to the output axis 123.1 of the driven shaft 123, the axis 137 of rotation and the spindle axis 138, and thus to the common axis 150 thereof. In this third exemplary embodiment, only the output axis 123.1, the axis 137 of rotation and the spindle axis 138 are arranged on the common axis 150. The third drive axis 127.3 is arranged so as to be offset in accordance with the angular offset 170 at a predetermined angle from the common axis 150.

In a fourth exemplary embodiment, the output axis 123.1 and the drive axis 127 run in a mutually corresponding manner and extend for example in the same direction. The output axis 123.1 and the drive axis 127 form a geared motor axis 129 with a predetermined orientation. The geared motor axis 129 may be arranged so as to be axially in line with the common axis 150. Alternatively, the geared motor axis 129 formed from the output axis 123.1 and the drive axis 127 may be arranged so as to be offset from the common axis 150, in particular with a parallel offset 160 or an angular offset 170.

The coupling 136 between the geared motor unit 125, which is formed by the drive device 120 and the gearing unit 122, and the spindle bearing 140 is configured in such a way that this coupling 136 can compensate for such an angular offset 170 or parallel offset 160 of the drive axis 127 only or the geared motor axis 129 formed by the output axis 123.1 and the drive axis 127.

In other words, the axis of the drive shaft 127 (also referred to as the motor shaft) or a geared motor axis 129 of the drive shaft 127 and the driven shaft 123 may deviate respectively from the common axis 150. For example, the axis of the drive shaft 127 or the geared motor axis 129 may have an offset in all spatial directions, for example the parallel offset 160 or the angular offset 170, relative to the common axis 150 of the coupling 136, the spindle 132 and the spindle bearing 140, and optionally the gearing unit 122. If the axis (second drive axis 127.2, third drive axis 127.3) of the drive shaft 127 or the geared motor axis 129 is offset from the common axis 150, all axes can be arranged completely within the cavity 118 of the rail pair 108.

The coupling 136 may also allow different spatial directions for the axis 137 of rotation. On the whole, however, all axes of rotation (output axis 123.1, drive axes 127.1, 137, 138, geared motor axis 129 of the components) may be arranged in a line or in the vicinity of the common axis 150 within the rail pair 108.

Expressions such as "comprise", "have", "include", "contain" and the like used in the claims do not exclude further elements or steps. The use of the indefinite article does not exclude a plurality.

The features which are disclosed in the above description, in the claims and in the figures can be of significance both individually and in combination for the implementation of the invention in the various embodiments thereof, provided that they remain within the scope of protection of the claims.

LIST OF REFERENCE SIGNS

100 Vehicle seat
102 Backrest
104 Seat part
106 Longitudinal adjuster
108 Rail pair
110 Seat rail
112 Floor rail
118 Cavity
120 Drive device
121 Motor
122 Gearing unit
123 Driven shaft
123.1 Output axis
124 Fastening
125 Geared motor unit
126 Seam
127 Drive shaft
127.1 First drive axis
127.2 Second drive axis
127.3 Third drive axis
128 Internal thread
129 Motor-gearing axis
130 Spindle block
132 Spindle
134 External thread
136 Coupling
136.1 Resilient plastic material element
136.2 Damping element
137 Axis of rotation of the coupling
138 Spindle axis
140 Spindle bearing
142 Connecting nut
143 Connecting bolt
144 Ball bearing
146 Spindle nut
150 Common axis
160 Parallel offset
170 Angular offset
x Longitudinal direction
y Transverse direction
z Vertical direction

The invention claimed is:

1. A longitudinal adjuster, comprising:
a rail pair and
a drive device for the rail pair,
wherein the rail pair has a first rail and a second rail, on which the first rail is displaceably guided,
wherein the drive device has at least one motor, a gearing unit, a spindle block which is fixed to the first rail or second rail and has an internal thread, and a spindle having an external thread, which is operatively connected to the internal thread of the spindle block, a spindle bearing and a coupling for coupling the spindle and the motor,
wherein the spindle is mounted in the spindle block so as to be rotatable about a spindle axis,
wherein the gearing unit, the coupling, the spindle and the spindle bearing are arranged on a common axis within the rail pair, and
wherein a drive axis of the motor runs so as to be offset from the common axis within the rail pair and the motor is arranged at least in part within the rail pair.

2. The longitudinal adjuster as claimed in claim 1, wherein the common axis is arranged in a cavity formed between the first rail and the second rail.

3. The longitudinal adjuster as claimed in claim 1, wherein the common axis is enclosed by the first rail and the second rail.

4. The longitudinal adjuster as claimed in claim 1, wherein the drive axis has a parallel offset or angular offset relative to the common axis of the gearing unit, coupling, spindle and spindle bearing.

5. The longitudinal adjuster as claimed in claim 1, wherein, if the drive axis is offset from the common axis, all axes are arranged within the cavity of the rail pair.

6. The longitudinal adjuster as claimed in claim 1, wherein a driven shaft acting as the output shaft of the geared motor unit has an output axis which runs in a manner corresponding to the drive axis, these axes forming a geared motor axis which is arranged so as to be to offset from the common axis.

7. The longitudinal adjuster as claimed in claim 1, wherein the coupling is designed as a compensating coupling or a friction coupling.

8. The longitudinal adjuster as claimed in claim 1, wherein the coupling comprises at least one resilient plastic material element and/or a damping element.

9. A vehicle seat having at least one longitudinal adjuster as claimed in claim 1.

* * * * *